(12) United States Patent
Ma et al.

(10) Patent No.: US 10,116,402 B2
(45) Date of Patent: Oct. 30, 2018

(54) SYSTEM AND METHOD FOR OPERATING MODE SELF-ADAPTATION

(75) Inventors: Jianglei Ma, Ottawa (CA); Mohammadhadi Baligh, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 2095 days.

(21) Appl. No.: 13/283,022

(22) Filed: Oct. 27, 2011

(65) Prior Publication Data

US 2013/0107929 A1 May 2, 2013

(51) Int. Cl.
*H04B 17/382* (2015.01)
*H04B 17/345* (2015.01)
*H04W 72/08* (2009.01)
*H04W 16/10* (2009.01)

(52) U.S. Cl.
CPC ......... *H04B 17/382* (2015.01); *H04B 17/345* (2015.01); *H04W 72/08* (2013.01); *H04W 16/10* (2013.01)

(58) Field of Classification Search
USPC .............. 370/328, 252, 329, 336; 455/452.1, 455/452.2
See application file for complete search history.

(56) References Cited

U.S. PATENT DOCUMENTS

| | | |
|---|---|---|
| 2004/0001429 A1 | 1/2004 | Ma et al. |
| 2007/0105508 A1 | 5/2007 | Tong et al. |
| 2007/0263735 A1 | 11/2007 | Tong et al. |
| 2007/0274252 A1 | 11/2007 | Zhang et al. |
| 2007/0275729 A1* | 11/2007 | Kashima et al. ............. 455/453 |
| 2008/0090574 A1 | 4/2008 | Soong et al. |
| 2008/0151743 A1 | 6/2008 | Tong et al. |
| 2008/0253279 A1 | 10/2008 | Ma et al. |
| 2009/0060081 A1 | 3/2009 | Zhang et al. |
| 2009/0086648 A1 | 4/2009 | Xu et al. |
| 2009/0129334 A1 | 5/2009 | Ma et al. |

(Continued)

FOREIGN PATENT DOCUMENTS

| | | |
|---|---|---|
| CN | 101420699 A | 4/2009 |
| CN | 102007808 A | 4/2011 |

OTHER PUBLICATIONS

International Search Report of Patent Cooperation Treaty (PCT), International Application No. PCT/IB2012/002812, dated May 30, 2013, 5 pages.

(Continued)

*Primary Examiner* — Mandish Randhawa
(74) *Attorney, Agent, or Firm* — Slater Matsil, LLP

(57) ABSTRACT

A system and method for operating mode self-adaptation are provided. A method for controller operations includes collecting performance information about a communications system, determining a performance indicator from the performance information, and automatically switching an operating mode of the communications system in response to determining that the performance indicator meets a performance threshold. The operating mode of the communications system includes the communications system operating in an inter-cell interference coordination (ICIC) mode or a non-ICIC mode, and the operating mode of the communications system remains unchanged in response to determining that the performance indicator does not meet the performance threshold.

39 Claims, 7 Drawing Sheets

(56) References Cited

U.S. PATENT DOCUMENTS

| | | | |
|---|---|---|---|
| 2009/0232021 A1* | 9/2009 | Bachmutsky | 370/254 |
| 2009/0245197 A1 | 10/2009 | Ma et al. | |
| 2009/0257390 A1 | 10/2009 | Ji et al. | |
| 2009/0285163 A1 | 11/2009 | Zhang et al. | |
| 2010/0110996 A1* | 5/2010 | Tao | H04W 16/02 370/329 |
| 2010/0124181 A1 | 5/2010 | Hosein | |
| 2010/0203882 A1 | 8/2010 | Frenger et al. | |
| 2010/0278063 A1* | 11/2010 | Kim | H04L 5/0073 370/252 |
| 2010/0317364 A1* | 12/2010 | Zhang et al. | 455/452.2 |
| 2011/0003598 A1* | 1/2011 | Ma et al. | 455/452.1 |
| 2011/0085448 A1 | 4/2011 | Kuwahara | |
| 2011/0158187 A1* | 6/2011 | Komamura et al. | 370/329 |
| 2011/0223918 A1* | 9/2011 | Dahlen | H04W 24/00 455/436 |
| 2012/0281569 A1* | 11/2012 | Yamamoto | H04L 1/1893 370/252 |
| 2013/0172001 A1* | 7/2013 | Gerlach | H04W 16/32 455/450 |
| 2014/0038653 A1* | 2/2014 | Mildh et al. | 455/501 |
| 2014/0045500 A1* | 2/2014 | Dimou | H04W 36/0083 455/436 |
| 2014/0370906 A1* | 12/2014 | Lundborg et al. | 455/452.1 |

OTHER PUBLICATIONS

Fodor, G., et al., "Intercell Interference Coordination in OFDMA Networks and in the 3GPP Long Term Evolution System," Journal of Communications, vol. 4, No. 7, Aug. 2009, pp. 445-453.

Katzela, I., et al., "Channel Assignment Schemes for Cellular Mobile Telecommunication Systems: A Comprehensive Survey," IEEE Personal Communications, Jun. 1996, pp. 10-31.

Extended European Search Report received in Application No. 12843212.7-1857 dated Feb. 16, 2015, 8 pages.

Nortel, "Adaptive Fractional Frequency Reuse," 3GPP TSG-RAN Working Group 1, R1-062150, Tallinn, Estonia, Aug. 28-Sep. 1, 2006, 10 pages.

* cited by examiner

SYSTEM AND METHOD FOR OPERATING MODE SELF-ADAPTATION

TECHNICAL FIELD

The present invention relates generally to digital communications, and more particularly to a system and method for operating mode self-adaptation.

BACKGROUND

Inter-cell interference (ICI) may be considered to be interference at a cell due to transmissions originating in another cell. Usually, ICI occurs between adjacent cells of a communications system. As an example, relatively high-powered transmissions to and from a cell edge user (CEU) operating in a first cell may cause more interference to adjacent cells utilizing the same operating frequency than relatively lower-powered transmissions to and from a cell center user (CCU) operating in the first cell to adjacent cells utilizing the same operating frequency due to correspondingly higher power levels of the transmissions to and from the CEU.

FIG. 1 illustrates a prior art communications system 100. Communications system 100 includes a first enhanced NodeB (eNB) 105 and a second eNB 115. An eNB (also commonly referred to as a base station, communications controller, NodeB, and so forth) may be in communications with User Equipment (UE) operating within its coverage area. For example, eNB 105 may have a coverage area illustrated in FIG. 1 as hexagon 110, while eNB 115 may have a coverage area illustrated as hexagon 120. Operating within hexagon 110 may be a first UE 125 and a second UE 130. A UE may also be commonly referred to as a mobile station, user, terminal, subscriber, and so on).

A coverage area of an eNB (or more generally, a cell of an eNB) may be categorized based upon a distance to the eNB. For example, coverage area of eNB 105 (i.e., hexagon 110) may be categorized into two regions, with a first region being a cell center region (shown as circle 135) and a cell edge region (portions of hexagon 110 outside of circle 135, shown as region 140). Normally, with downlink fractional frequency reuse inter-cell interference coordination (ICIC), UEs operating within a cell center region, such as UE 125, may receive transmissions made at a lower power level than UEs operating outside of a cell center region, such as UE 130, due to their closer proximity to the eNB serving the coverage area.

Furthermore, since transmissions made by UEs (i.e., uplink transmissions) operating with a cell edge region, such as UE 130, are usually made at higher power levels and the UEs are also located closer to neighboring (e.g., adjacent) eNBs, the transmissions may cause more interference to the neighboring eNBs. For downlink transmissions, UEs in a first eNB (e.g., a serving eNB) that are located closer to a neighboring eNB (i.e., an adjacent eNB) may experience high interference from transmissions of the neighboring eNB than UEs operating in a cell center region of the first eNB.

One form of ICIC is fractional frequency reuse (FFR) ICIC. In FFR ICIC, available time and/or frequency resources may be divided into multiple parts, also commonly referred to as a FFR pattern or frequency reuse pattern, which may be allocated to different transmitters. The transmitters may then transmit only during times and/or in frequencies associated with their allocated time and/or frequency part(s), or transmit with different power densities in different time and/or frequency parts according to a predefined power density mask. Assignment of the time and/or frequency parts may be made so that adjacent and/or close transmitters cause little or no interference to one another and/or receivers. As an example, adjacent transmitters may be assigned different time and/or frequency part(s) so that their transmissions do not overlap either in time and/or frequency.

The FFR ICIC technique used may be referred by the number of parts that the available resources are divided into. As an example, FFR with reuse-2 would divide the available resources into two parts that may be assigned to transmitters in an attempt to reduce interference. Similarly, FFR with reuse-3 would divide the available resources into three parts, while FFR with reuse-1 would not divide the available resources at all and may be indicative of non-FFR operation.

It is widely considered that ICI management will be a key technology for enhancing the performance of Third Generation Partnership Project (3GPP) Long Term Evolution (LTE) compliant communications systems, for example, and overall UE experience. Therefore, there is a need for ICI reducing techniques, of which, ICIC is one form. ICIC is a simple and efficient ICI management scheme. Generally, ICIC attempts to reduce and/or control ICI through the use of radio resource management (RRM) methods. Typically, ICIC takes into account information from multiple cells, such as neighboring cells, to control inter-cell interference. A usual ICIC strategy may be to determine resources available at a cell, which may then be scheduled (i.e., allocated) to users. ICIC in Orthogonal Frequency Division Multiple Access (OFDMA) communications systems, such as 3GPP LTE communications systems, have received considerable study.

A persistent challenge to communications systems is the change in operating conditions over time. For example, cell loading may change over time, UE distribution geometries may change over time, number of scheduled UEs may change over time, and so forth. As the operating conditions change, an operating mode that yielded good performance under a first set of operating conditions may no longer provide good performance under a second, different set of operating conditions. Additionally, operating conditions may vary on a geographical basis, and an operating mode that works well in one area may not work as well in another. Therefore, there is a need for a system and method that allows for operating mode self-adaptation at a variety of different granularities to meet changing operating conditions in the communications system.

SUMMARY OF THE INVENTION

These and other problems are generally solved or circumvented, and technical advantages are generally achieved, by example embodiments of the present invention which provide a system and method for operating mode self-adaptation.

In accordance with an example embodiment of the present invention, a method for controller operations is provided. The method includes collecting performance information about a communications system, determining a performance indicator from the performance information, and automatically switching an operating mode of the communications system in response to determining that the performance indicator meets a performance threshold. The operating mode of the communications system includes the communications system operating in an inter-cell interference coordination (ICIC) mode or a non-ICIC mode, and the operating mode of the communications system remains unchanged in response to determining that the performance indicator does not meet the performance threshold.

In accordance with another example embodiment of the present invention, a method for controller operations is provided. The method includes setting an operating mode for a communications system including a plurality of communications controllers to a non inter-cell interference coordination (ICIC) mode. The method also includes determining if a first switching condition is met, and switching the operating mode to an ICIC mode if the first switching condition is met, where the operating mode is left unchanged if the first switching condition is not met. The method further includes determining if a second switching condition is met, where the second switching condition is met only if the operating mode is the ICIC mode. The method additionally includes setting a frequency reuse mode for each communications controller in a first subset of communications controllers of the plurality of communications controllers if the second switching condition is met, where the frequency reuse mode of each communications controller in the first subset of communications controllers is not set if the second switching condition is not met. Furthermore, the method includes determining if a third switching condition is met, where the third switching condition is met only if the operating mode is the ICIC mode. Additionally, the method includes switching the operating mode of each communications controller in a second subset of communications controller in the first subset of communications controllers to an ICIC operating mode that approximates non-ICIC operation if the third switching condition is met, where the operating mode is left unchanged if the third switching condition is not met.

In accordance with another example embodiment of the present invention, a controller is provided. The controller includes a metric unit, a threshold unit, and a switching unit. The metric unit collects performance information about a communications system and determines a performance indicator from the performance information, the threshold unit determines if the performance indicator meets a performance threshold, and the switching unit switches an operating mode of the communications system responsive to an output of the threshold unit. The operating mode of the communications system includes operating the communications system in an inter-cell interference coordination (ICIC) mode or a non-ICIC mode, and the operating mode of the communications system remains unchanged in response to determining that the performance indicator does not meet the performance threshold.

One advantage of an embodiment is that the operating mode of different portions of a communications system, down to a cell level, may be adapted to meet operating conditions. Such a fine level of adaptation may allow for an optimal or near optimal level of performance throughout the entirety of the communications system.

A further advantage of an embodiment is that the self-adaptation of the operating mode of the communications system may be performed automatically. Therefore, labor-intensive (and therefore expensive), difficult, time-delayed and potentially error-prone manual operating mode adjustments can be altogether avoided.

Yet another advantage of exemplary embodiments is that the self-adaptation may be performed and implemented without having to stop normal operations of the communications system. Therefore, service to users may be maintained during self-adaptation.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The operating and structure of the current example embodiments are discussed in detail below. It should be appreciated, however, that the present invention provides many applicable inventive concepts that can be embodied in a wide variety of specific contexts. The specific embodiments discussed are merely illustrative of specific structures of the invention and ways to operate the invention, and do not limit the scope of the invention.

The present invention will be described with respect to example embodiments in a specific context, namely a wireless communications system that supports inter-cell interference coordination ("ICIC"). The invention may be applied to a variety of standards compliant communications systems, such as Third Generation Partnership Project (3GPP) Long Term Evolution (LTE), 3GPP LTE-Advanced, WiMAX, IEEE 802.16, and so forth, as well as non-standards compliant communications systems.

Fractional Frequency Reuse (FFR) is an important ICIC technique for orthogonal frequency division multiple access (OFDMA) systems. FFR reduces the interference caused by neighboring cells using the same frequency band and can thus help to increase user throughput and overall network capacity. FFR may be difficult to implement in areas with complicated interference scenarios, such as large metropolitan areas. For example, FFR with reuse-3 may not be capable of handling the frequency planning difficulties involved in such complicated interference scenarios since the three modes may not be sufficient to assign non-overlapping patterns. Therefore, degraded communications system performance may be seen, such as a decrease in the overall coverage of the communications system and/or poor handover (HO) performance.

Figure 1:
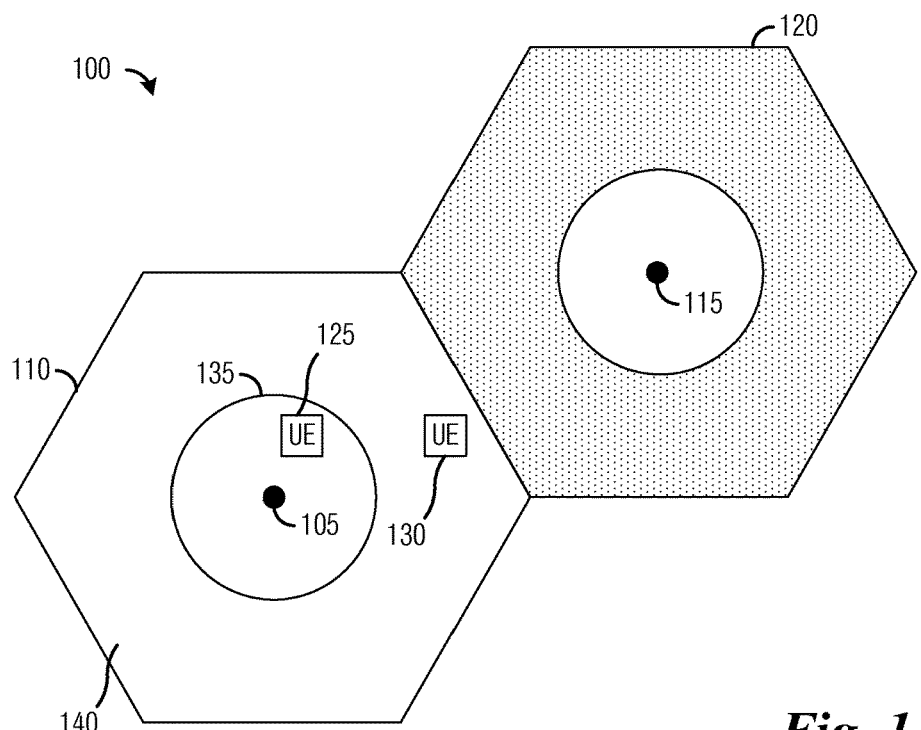
FIG. 1 illustrates an example prior art communications system.
Figure 2:
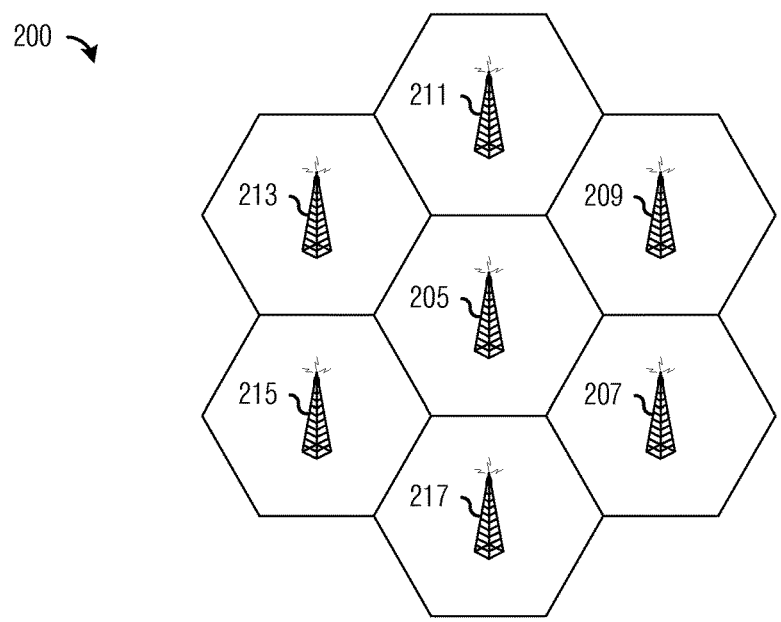
FIG. 2 illustrates an example communications system according to example embodiments described herein.

FIG. 2 illustrates a communications system 200. Communications system 200 includes a plurality of cells, such as cells 205 through 217. A first-order neighboring cell may be defined as cells that are directly adjacent to one another. As shown in FIG. 2, cells 207 through 217 are first-order neighboring cells of cell 205. A second-order neighboring cell may be defined as cells that are not directly adjacent to one another but are neighboring cells to one common intermediate cell. As shown in FIG. 2, cells 209 and 215 are second-order neighboring cells (through common intermediate cell 205). Similar relationships exist for higher-order neighboring cells.

Generally, a coverage area of an eNB may be sectorized into a number of sectors in order to increase utilization, decrease interference, and so forth. Each sector may be referred to as a cell. Therefore, without loss of generality, when referring to coverage areas, a cell may be descriptive of a portion of an eNB or the coverage area of the eNB in its entirety.

As discussed previously, there may be many situations and configurations wherein a single operating mode for a communications system may not be able to provide a desired level of performance for the entirety of the communications system. For example, consider a large communications system that spans a heavily congested metropolitan area as well as lightly used rural area. It is unlikely that a single operating mode, be it no ICIC (e.g., reuse-1), full ICIC, or partial ICIC, that will provide good performance throughout the communications system. Therefore, there is a need for a system and method that allows for operating mode self-adaptation based on operating conditions at a variety of different granularities.

Figure 3:
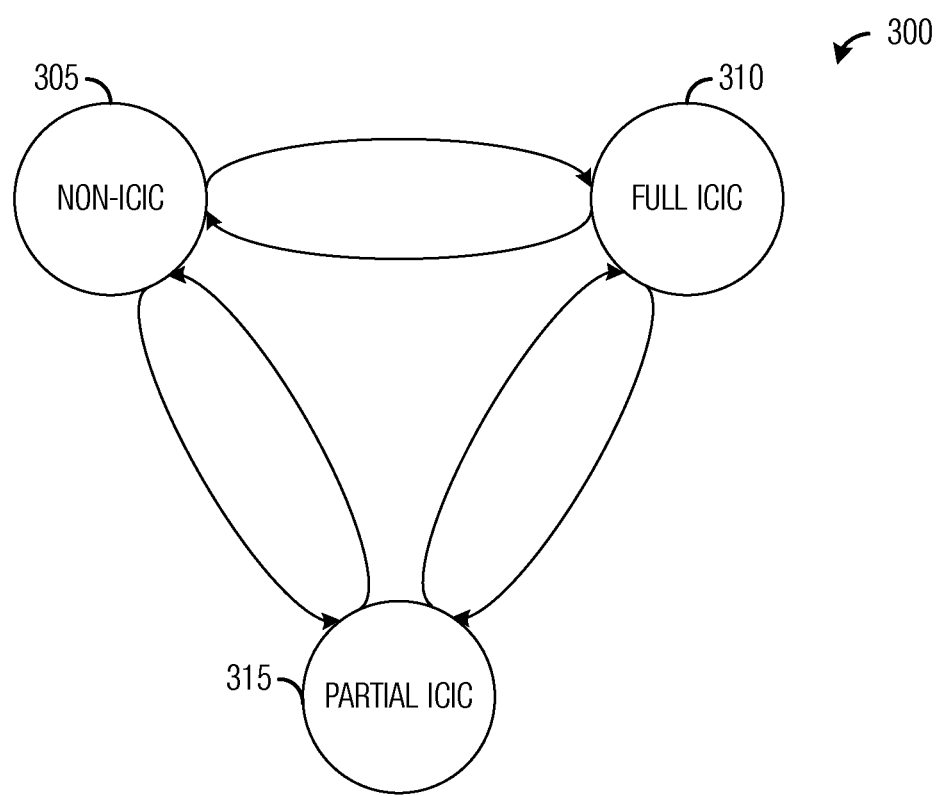
FIG. 3 illustrates an example state diagram according to example embodiments described herein.

FIG. 3 illustrates a state diagram 300. State diagram 300 shows possible operating modes for a communications system. The communications system may operate in a non-ICIC mode 305, a full ICIC mode 310 where all cells in the communications system operates in ICIC mode, or a partial ICIC mode 315 where a subset of cells in the communications system operates in ICIC mode.

Although the discussion of FIG. 3 focuses on the operating mode of an entire communications system, state diagram 300 may also be illustrative of the operating mode of a single cell or a group of cells. For example, a group of cells may operate together in a non-ICIC, partial ICIC, or full ICIC operating mode. Therefore, the discussion of FIG. 3 in the context of a communications system in its entirety should not be construed as being limiting to either the scope or the spirit of the example embodiments.

Generally, the communications system in its entirety will operate in non-ICIC mode 305 or not operate in non-ICIC mode 305. Once the communications system has been switched away from non-ICIC mode 305, portions of the communications system may utilize non-ICIC mode communications. Cells utilizing non-ICIC mode communications may not be assigned a FFR mode and may therefore have a constant transmit power density over the entirety of available bandwidth. These cells may transmit at a power level consistent with a power level used by cells operating in a reuse-1 mode or at any available lower power level (i.e., a power level wherein a transmit signal amplifier is not set at its highest power setting).

In addition to restricting operating mode based on frequency and/or time resources, it may be also possible to restrict operating mode based on transmit power. As an example, a transmitter may be restricted to transmit using one or more of a set of possible transmit power levels or densities.

As shown in FIG. 3, a communications system may be able to transition between the various states. For example, a communications system operating in non-ICIC mode 305 may be able to transition to full ICIC mode 310 or partial ICIC mode 315, and vice versa. Similarly, a communications system operating in full ICIC mode 310 may be able to transition to partial ICIC mode 315 or non-ICIC mode 305, and vice versa.

According to an example embodiment, transitions between the various states may be made based on metrics of the performance of the communications system. For example, a metric may measure load, traffic pattern, error rates, data rates, handover rates, and so forth, of the communications system, as well as load, traffic pattern, error rates, data rates, handover rates, and so forth, of cells and/or eNBs in the communications system. If the metric(s) meet a threshold(s), then a transition between states may occur, while if the metric(s) does not meet the threshold(s), then a transition between states may not occur.

Figure 4:
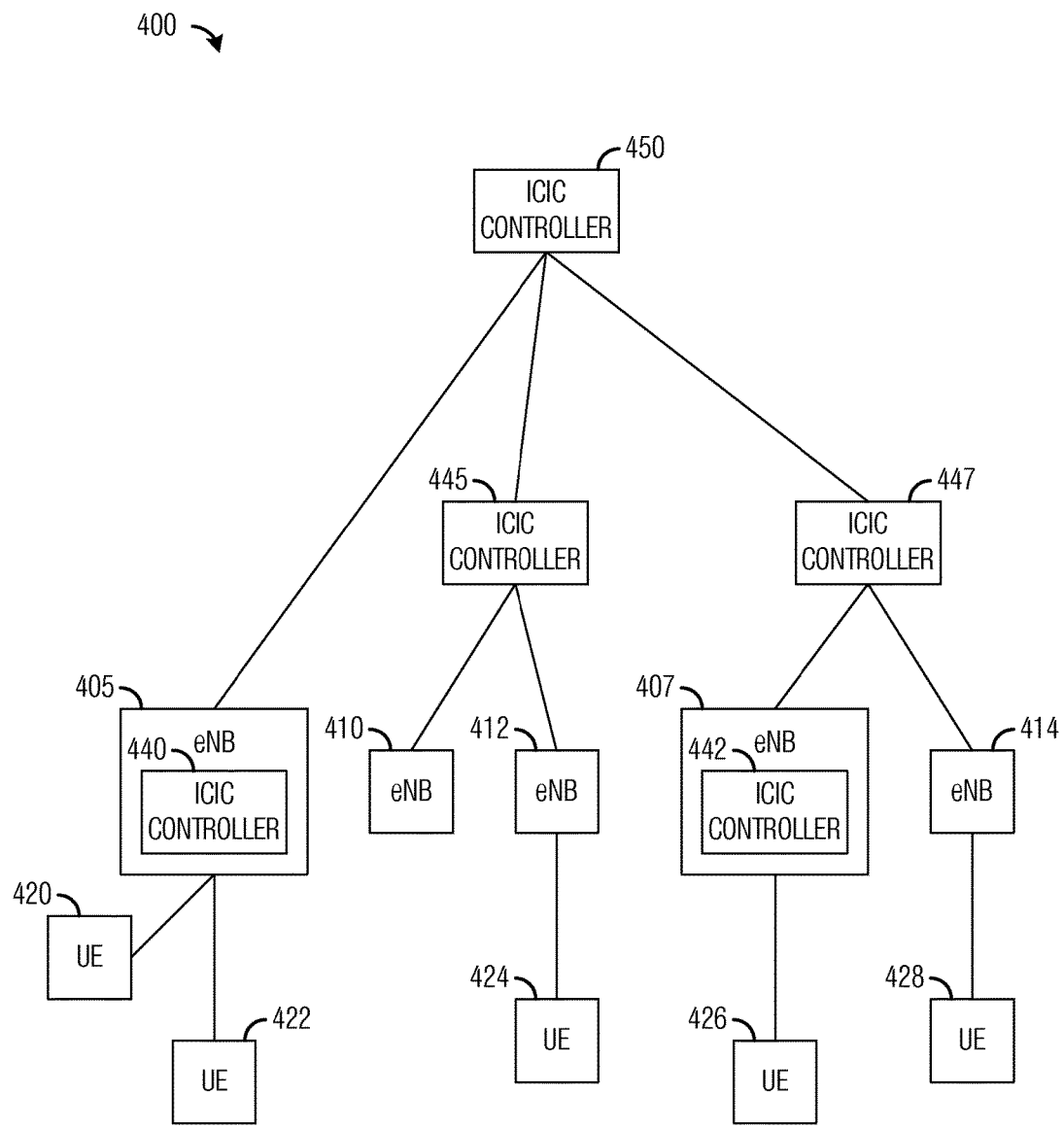
FIG. 4 illustrates an example communications system with ICIC controllers determining the operating mode of eNBs in the communications system according to example embodiments described herein.

FIG. 4 illustrates a communications system 400 with ICIC controllers determining the operating mode of eNBs in communications system 400. Communications system 400 includes a plurality of eNBs, such as eNB 405, eNB 407, eNB 410, eNB 412, and eNB 414, and a plurality of UEs, such as UE 420, UE 422, UE 424, UE 426, and UE 428. The UEs communicate through their respective controlling eNBs. As an example, UE 420 and UE 422 communicate through eNB 405, while UE 424 communicates through eNB 412.

ICIC controllers may determine the operating mode of eNBs in communications system 400. There may be several different types of ICIC controllers. At a first level, there may be an individualized ICIC controller located in an eNB that may set the operating mode for the eNB. As an example, ICIC controller 440 is an individualized ICIC controller for eNB 405. Similarly, ICIC controller 442 is an individualized ICIC controller for eNB 407. ICIC controller 440 and ICIC controller 442 may determine the operating mode of the eNBs connected to them in a distributed operation mode control configuration. Although shown to be located in an eNB, an individualized ICIC controller may be co-located or coupled to its eNB.

Not all eNBs may have an individualized ICIC controller. As shown in FIG. 4, eNB 410, eNB 412, and eNB 414 do not have individualized ICIC controllers. According to an example embodiment, an eNB may have an individualized ICIC controller if it is placed in a location with a difficult interference scenario, which may result in a need for rapid and frequent interaction with an ICIC controller.

At a second level, there may be localized ICIC controllers coupled to subsets of eNBs. The localized ICIC controller may set the operating mode for the eNBs in the subset of eNBs to which it is coupled. As an example, ICIC controller 445 is a localized ICIC controller for eNB 410 and eNB 412, while ICIC controller 447 is a localized ICIC controller for eNB 407 and eNB 414. ICIC controller 445 and ICIC controller 447 may determine the operating mode of the eNBs coupled to them in a partially distributed operation mode control configuration. Additionally, a localized ICIC controller may be coupled to other localized ICIC controllers as well as eNBs.

At a third level, there may be a global ICIC controller coupled to eNBs and ICIC controllers. The global ICIC controller may set the operating mode for the eNBs in the communications system. As an example, ICIC controller 450 is a global ICIC controller for the eNBs in communications system 400. ICIC controller 450 may determine the operating mode of the eNBs in communications system 400 in a centralized operation mode control configuration or a partially distributed operation mode control configuration.

It is noted that FIG. 4 illustrates a limited number of eNBs, UEs, and ICIC controllers. It is well understood that a communications system may include any number of eNBs, UEs, and ICIC controllers. However, a limited number of eNBs, UEs, and ICIC controllers are illustrated to maintain simplicity.

Figure 5:
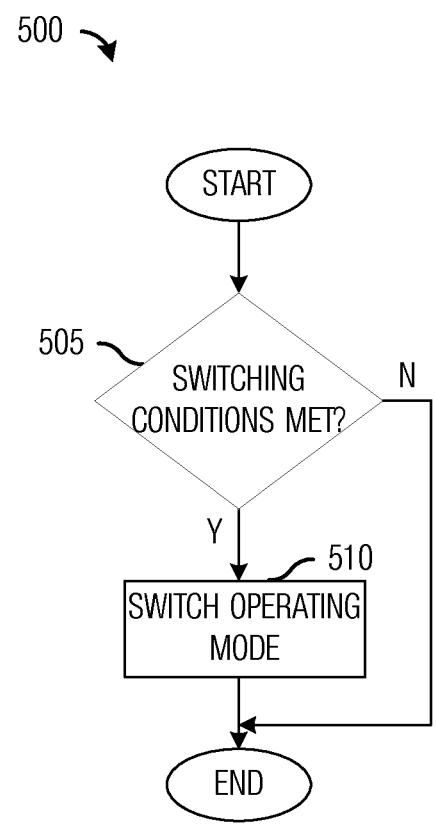
FIG. 5 illustrates an example flow diagram of operations in switching an operating mode of a communications system according to example embodiments described herein.

FIG. 5 illustrates a flow diagram of operations 500 in switching an operating mode of a communications system. Operations 500 may be indicative of operations occurring in an ICIC controller in the communications system responsible for determining the operating mode of the communications system in a centralized operation mode control configuration or a partially distributed operation mode control configuration, or an ICIC controller located in eNBs of the communications system in a fully distributed operation mode control configuration.

Operations 500 may begin with the ICIC controller (located in the communications system and/or in the eNBs) performing a check to determine if switching condition(s) are met (block 505). According to an example embodiment, switching conditions may be based wholly or in part on performance of the communications system, operating condition(s) of or in the communications system, or a combination thereof. For example, switching conditions may include UE distribution geometry (e.g., cell center UEs, cell edge UEs, or so on), number of scheduled UEs, cell load, interference level, handover performance, or combinations thereof. Metrics may be used to determine if switching conditions are met.

If the switching condition(s) are met, then the ICIC controller located in the communications system may switch the operating mode of the communications system or a portion of the communications system, or ICIC controller located in the eNBs may switch the operating mode of the eNBs based on the switching condition(s) (block 510). If the switching condition(s) are not met, then the ICIC controller located in the communications system retains the current operating mode of the communications system or the portion of the communications system, or ICIC controller located in the eNBs may retain the operating mode of the eNBs.

As an illustrative example, consider a situation wherein at an ICIC controller located in the communications system, the switching condition(s) are met for a subset of the communications system, then, the ICIC controller may switch the operating mode of the subset of the communications system, while maintaining the current operating mode for the remainder of the communications system. As another illustrative example, consider a situation wherein at an ICIC controller located in an eNB of a communications system, the switching condition(s) are met, then the ICIC controller may switch the operating mode for its eNB independent of ICIC controllers in other eNBs and/or ICIC controller in the communications system. Generally, only eNBs that have been so enabled by its ICIC controller located in the communications system may be able to switch their own operating mode. Although the ICIC controller located in the eNB may select the operating mode for its eNB, in certain situations, an ICIC controller located in the communications system and responsible for the eNB may override the operating mode selection of ICIC controller located in the eNB.

Figures 6A, 6B:
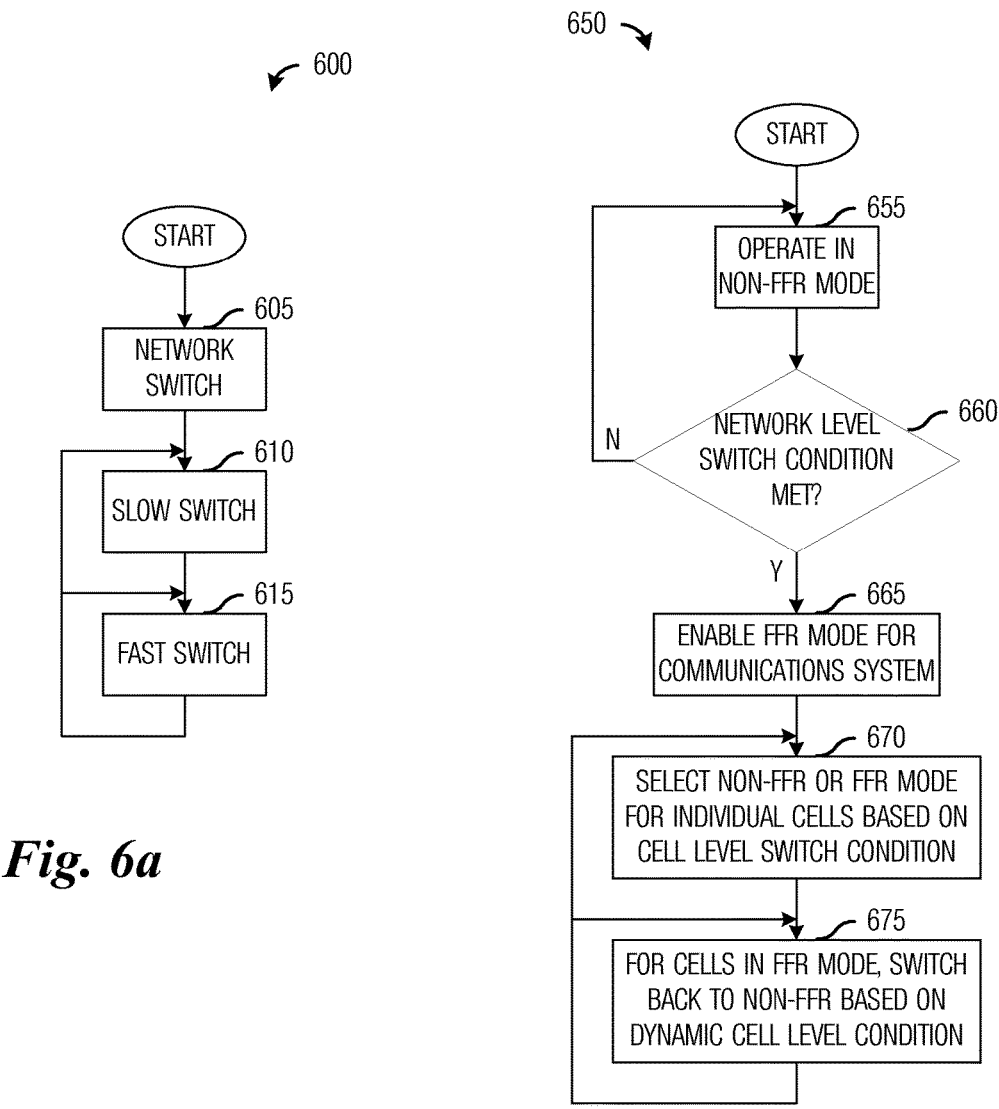
FIG. 6a illustrates an example flow diagram of high level operations in determining an operating mode of a communications system and/or cells in the communications system according to example embodiments described herein.
FIG. 6b illustrates an example flow diagram of operations in determining an operating mode of a communications system and/or cells in the communications system according to example embodiments described herein.

FIG. 6a illustrates a flow diagram of high-level operations 600 in determining an operating mode of a communications system and/or cells in the communications system. Operations 600 may be indicative of operations occurring in an ICIC controller of the communications system responsible for determining the operating mode of the communications system in a centralized operation mode control configuration. Although the discussion focuses on an ICIC controller performing centralized operation mode control configuration (i.e., a global ICIC controller), the ICIC controller may also perform a partially distributed operation mode control configuration (i.e., a global or local ICIC controller), or a fully distributed operation mode control configuration, such as in an ICIC controller located in an eNB (i.e., an individualized ICIC controller).

Operations 600 may begin with the communications system operating in a first state, wherein the communications system, including all of the eNBs of the communications system operating in the first state. Then, based on switching condition(s), the ICIC controller may determine to switch the communications system to a second state, thereby performing a network switch (block 605). According to an example embodiment, the switch from the first state to the second state may be performed for the entirety of the communications system. As an example, the communications system may begin in a non-FFR mode and then switch to a mode where FFR is enabled.

According to an example embodiment, the ICIC controller may determine to switch based on information provided by the eNBs of the communications system, wherein the information may be based on signal power, interference power, signal to noise ratio, signal to interference plus noise ratio, and so forth. According to an example embodiment, the controller may also collect information about the communications system and its performance, and make use of the information to compute metrics.

Once the network switch has been performed (block 605), the ICIC controller (the ICIC controller in the communications system, as well as the ICIC controller in the eNBs) may perform slow switches (block 610) and/or fast switches (block 615) to adapt the operating mode of the communications system and eNBs in the communications system to meet changing operating conditions.

According to an example embodiment, a slow switch may be performed by an ICIC controller located in the communications system, such as a global ICIC controller or a local ICIC controller, and may be based on relatively slowly changing information and/or statistics thereof, such as signal and/or interference measurement information, performance information, UE distributions, cell loads, and so forth. A fast switch, on the other hand, may be performed by an ICIC controller located in an eNB and may be based on rapidly changing information, such as UE distributions, cell load, and so forth.

Since the slow switches may be based on slowly changing information, a frequency of the slow switches may be lower than a frequency of the fast switches. As an example, a fast switch may be performed or scheduled to be performed once every few milliseconds, while a slow switch may be performed or scheduled to be performed once every few hundred milliseconds or seconds. In general, the slow switches may occur with a period that is a few orders of magnitude greater than a period for the fast switches.

According to an example embodiment, a slow switch may be used to determine an operating mode, e.g., a frequency reuse mode, for a cell, a group of cells, an eNB, a group of eNBs, or the communications system, wherein the determining may be performed by an ICIC controller located in the communications system for all of the eNBs in the communications system or a subset of eNBs in the communications system.

According to an example embodiment, a fast switch may also be used to determine an operating mode, e.g., a frequency reuse mode, for an eNB, wherein the determining may be performed by the ICIC controller located in the eNB. Although the fast switch may be based on information provided by other eNBs, e.g., neighboring eNBs, controllers, and so forth, the fast switch itself may be performed independent of other eNBs, the ICIC controller located in the communications system, and so on.

FIG. 6b illustrates a flow diagram of operations 650 in determining an operating mode of a communications system and/or cells in the communications system. Operations 650 may be indicative of operations occurring in an ICIC controller of the communications system responsible for determining the operating mode of the communications system in a centralized operation mode control configuration, such as an ICIC controller located in the communications system. Although the discussion focuses on an ICIC controller performing centralized operation mode control configuration, the ICIC controller may also perform a partially distributed operation mode control configuration, or a fully distributed operation mode control configuration, such as an ICIC controller located in an eNB.

Operations 650 may begin with the communications system operating in a first state, wherein the communications system, including all of the eNBs of the communications system, operating in a non-FFR mode (block 655). According to an example embodiment, the communications system may operate in a reuse-1 mode, i.e., the eNBs of the communications may transmit using a portion (up to an entirety) of available network bandwidth, when operating in the first state.

While operating in the first state, the eNBs initiate Reference Signal Received Power (RSRP) measurements by UEs served by the eNBs. The eNBs may then collect the RSRP reports from their respective UEs and generate local mutual relationship information, such as neighbor relationship tables (NRTs), from the RSRP reports. The eNBs may report their local mutual relationship information to an ICIC controller, such as an Operations Support System (OSS), for example, that may be responsible for configuring the communications system. From the local mutual relationship information, the ICIC controller may generate global mutual relationship information, e.g., a global NRT.

According to an example embodiment, the ICIC controller may also collect other information regarding the communications system and its performance, to compute metrics, for example. For example, the ICIC controller may collect long term statistical information, including resource block utilization rate, number of active UEs (e.g., a number of UEs to be scheduled), UE distribution information, handover performance, communications system load, and so forth.

Using the global mutual relationship information, as well as the other information regarding the communications system and its performance, the ICIC controller may perform a check to determine if a network level ICIC switch should be performed (block 660). As an example, the ICIC controller may determine that the network level ICIC switch should be performed if indicators meet specified thresholds. Exemplary indicators include interference level (based on global mutual relationship information), communications system load (based on long term resource block utilization, for example), number of UEs scheduled (based on long term information, for example), UE handover performance (handover success and/or failure rate, for example), and so on.

According to an example embodiment, a number of UEs scheduled for transmissions may be used to determine if the network level ICIC switch should be performed. Generally, a cell or eNB may be defined as being dense if its long term average number of UEs scheduled for transmissions (i.e., active UEs) is above a pre-defined threshold. Therefore, a UE number based ICIC switch indicator may be set to "true" if the number of dense cells or eNBs in the communications system is above a pre-defined threshold. Typically, the network level ICIC switch will not be performed if there are one or two UEs in each cell.

According to an example embodiment, a communications system load may be used to determine if the network level ICIC switch should be performed. Generally, a cell or eNB may be defined as being non-lightly loaded if its load, for example, resource block utilization, is above a pre-defined threshold. Therefore, a communications system load based ICIC switch indicator may be set to "true" if the number of non-lightly loaded cells or eNBs is above a pre-defined threshold.

According to an example embodiment, communications system interference level may be used to determine if the network level ICIC switch should be performed. Typically, a cell (or eNB) pair may be identified as a conflict pair if their mutual interference is above a pre-defined threshold. The threshold may be defined as symmetric (substantially equal interference between both cells or eNBs of the pair) or asymmetric (unequal interference between the cells or eNBs of the pair). Hence, a communications system interference level based ICIC switch indicator may be set to "true" if a number of conflict pairs is above a pre-defined threshold.

According to an example embodiment, handover performance may be used to determine if the network ICIC switch should be performed. For example, if an aggregate handover failure rate for the communications system exceeds a pre-defined threshold, then a handover performance based ICIC switch indicator may be set to "true." Alternatively, if a count of handover failure rates for individual cells or eNBs exceeds a threshold, then a handover performance based ICIC switch indicator may be set to "true." Other handover performance measures may include handover latency, handover initiation rates, and so forth.

According to an example embodiment, combinations of the network ICIC switch indicators may be used to determine if the network ICIC switch should be performed. Additionally, combinations of the pre-defined thresholds may also be used to determine if the network ICIC switch should be performed. Furthermore, a combination of the pre-defined thresholds may utilize adjusted threshold values. For example, a combination of communications system interference level and handover performance to determine if the network ICIC switch should be performed may have the pre-defined threshold values adjusted, such as to a lower value for one or both of the pre-defined thresholds.

If the network ICIC switch should not be performed, i.e., the ICIC switch indicator(s) are not set to "true," the communications system will operate in non-FFR mode, operating in reuse-1 mode with power control, for example.

If the network ICIC switch should be performed, i.e., the ICIC switch indicator(s) are set to "true," the ICIC mode will be enabled and the controller may determine FFR reuse patterns for each cell or eNB in the communications system (block 665). According to an example embodiment, the ICIC controller may make use of a coloring algorithm to determine FFR reuse patterns for each cell or eNB in the communications system. The coloring algorithm may make use of available mutual relationship information, such as neighbor relation tables (NRTs) from the eNBs in the communications system, and/or global mutual relationship information determined by the controller based on the mutual relationship information from the eNBs. The ICIC controller may provide information about the FFR reuse patterns to the cells and eNBs. According to an example embodiment, the coloring algorithm may be executed in a centralized manner on an ICIC controller that determines operating mode for all eNBs in the communications system (e.g., a global ICIC controller), an ICIC controller that determines operating mode for a subset of eNBs in the communications system (e.g., a global ICIC controller or a local ICIC controller), or in a distributed manner on an ICIC controller located in an eNB, or a combination thereof (for example, a centralized approach for each local controller and its attendant eNBs, but in a distributed manner for the various ICIC controllers located in the eNBs).

Collectively, blocks 655, 660, and 665 may be part of a network level switch, such as network switch 605 shown in FIG. 6a.

According to an example embodiment, since the network ICIC switch is performed automatically without operator intervention, the network ICIC switch may be performed without significant downtime that would be noticeable by users of the communications system. For example, the communications system would not need to be switched into a configuration mode from a normal operating mode and then the operating mode changed and then the communications system would not need to be switched back into the normal operating mode.

In general, once the controller enables ICIC mode, the entire communications system is now operating in ICIC mode. However, such need not be the case; other operational arrangements are possible in accordance with the teachings of the invention.

With the communications system operating in ICIC mode, a semi-static cell level mode switch controlled by the ICIC controller may be performed to select FFR mode for individual cells (block 670). According to an example embodiment, the semi-static cell level mode switch controlled by the ICIC controller may be performed once the communications system is operating in ICIC mode and may be used to determine which cells and/or eNBs should be configured with FFR.

According to an example embodiment, restrictions may be placed on transmit power levels based on the switching condition(s) used to trigger the switch. For example, if the switching condition is intercell interference, then transmit power levels of non-FFR cell(s) may not be restricted. Furthermore, non-ICIC-like operation may be achieved (i.e., approximated) in ICIC mode by selecting a reuse-1 mode with restrictions on transmit power level.

In general, the semi-static cell level mode switch controlled by the ICIC controller may determine which cells and/or eNBs may participate in FFR mode determination, i.e., which cells and/or eNBs will be included in the selection of FFR modes through the use of coloring algorithm(s).

A determination that a cell should be configured with FFR may be made through an interference level at the cell and/or other factors, such as cell load, number of scheduled UE, handover performance, and so forth. ICIC self-configuration may be used to actually determine FFR mode(s) assigned to the cell which is identified as a FFR cell. If a cell is determined to not be configured with FFR, then the cell may achieve (i.e., approximate) non-ICIC-like operation by utilizing reuse-1 mode with restrictions on transmit power level (if the mode switch is determined under individualized control, e.g., by an ICIC controller located at an eNB) and without restrictions on transmit power level (if the switch is determined under global control according to inter-cell interference level, e.g., by the global ICIC controller), for example.

According to an example embodiment, the thresholds used in the semi-static cell level mode switching may be different in different scenarios. For example, in a frequency selective scheduling system with many low-speed UEs, a threshold may be set to a higher value to produce a larger number of cells operating in non-FFR mode, leaving only a small number of tightly coupled cells to operate in FFR mode. In contrast, in a frequency diversity scheduling system with many high-speed UEs, the threshold may be set to a lower value to produce a larger number of cells operating in FFR mode. Note that it may not be desirable to implement frequency selective scheduling in every cell in a communications system since frequency selective scheduling gain may depend upon UE distribution and speed, level of service level, channel dispersion, and so forth. Therefore, the threshold may be set differently in different situations.

Furthermore, for cells that impose a low level of interference to their neighbors (as indicated in the neighbor relationship information for the cells), reuse-1 mode may be set. Additionally, cells with neighbor relationship information below a threshold may operate in non-FFR mode. The threshold may be symmetric or asymmetric, with an asymmetric criteria being potentially more suitable for configurations where some neighboring cells are experiencing different levels of interference from one another and a symmetric criteria being potentially more suitable for situations where the network is more homogenous. The thresholds may be applied to a largest (or a specified number of largest) interferers or a summation of interferers, or any other combination of interferers (such as, weighted, scaled, or so forth).

With the communications system operating in ICIC mode, a dynamic eNB level mode switch controlled by individual eNBs may be performed further to select FFR mode for individual eNBs and/or their respective cells (block 675). The dynamic level mode switch may be controlled by an individual eNB for its cells or the eNB as a whole. The dynamic level mode switch may take advantage of fast changing information, such as UE distribution geometries, cell loading, and so forth.

In some situations, a FFR mode may not be able to help a cell's performance and an ICIC controller for the cell which is configured as a FFR cell by the global ICIC controller based slow ICIC switch may give up the cell's high power region in return for a low power setting that enables the cell to use its entire band. The cell may gain flexible scheduling over the entirety of the band even if there is only one active user in the communications system. According to an example embodiment, transmit power in the high power region may be boosted for quadrature phase shift keying (QPSK)-modulated UEs.

For example, when a cell has a low cell edge load, such as when there are no cell edge UEs or a small number of UEs with limited traffic, the use of the high power region of the cell may not be needed, then the high power region may be abandoned, allowing for the assignment of all of its users and its band (in its entirety) to the low power region, thereby reducing interference to neighboring cells.

Also, if a cell has a small number of active users (on the order of one or two UEs, for example), a UE categorization into two regions, e.g., high power and low power, may unfairly reduce available bandwidth to the UE assigned to the high power region. The reduced bandwidth to the high power UE would reduce its perceived bandwidth. In such a scenario, all UEs may be assigned to the low power region, therefore, the UEs have access to the entire band. If the formerly high power UE uses quadrature phase shift keying modulation, it may still have access to the high power region and benefits from the power boost in that part of the band.

In cells with low cell edge load or small number of active users, as the cell edge load or the number of active users increase, the high power region may be reclaimed and the users may henceforth be categorized in the high power region and the low power region as discussed previously.

According to an example embodiment, the dynamic cell level mode switch may allow an eNB that is configured to operate in FFR mode to disable its high power band and fall back to reuse-1 mode (non-ICIC-like operation). A determination of the dynamic level mode switch may be based on factors such as UE distribution geometry (e.g., turn off ICIC if the SINR of all UEs in a cell are above a threshold), a number of scheduled UEs (e.g., turn off ICIC when the number of scheduled UEs is below a threshold), a cell load (e.g., turn off ICIC when the cell load is low), and so forth. Furthermore, a power setting for UEs using non-quadrature amplitude modulation follows a power density of a low power band, but QPSK-modulated UEs may be scheduled with different transmit powers in different resource block groups.

Figure 7:
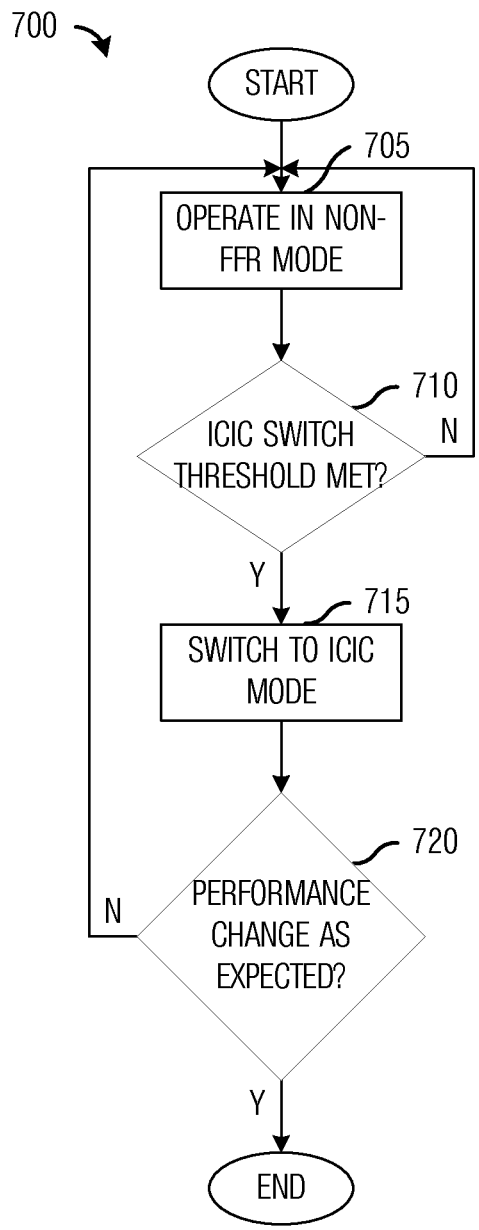
FIG. 7 illustrates an example flow diagram of operations in determining an operating mode of a communications system according to example embodiments described herein.

FIG. 7 illustrates a flow diagram of operations 700 in determining an operating mode of a communications system. Operations 700 may be indicative of operations occurring in an ICIC controller of the communications system responsible for determining the operating mode of the communications system, such as an ICIC controller located in the communications system or an ICIC controller located in an eNB.

Operations 700 may begin with the ICIC controller setting the communications system to operate in a non-FFR mode (block 705). According to an example embodiment, the communications system operating in the non-FFR mode may occur after the communications system is powered on, after the communications system has been reset, or so on. Alternatively, the communications system may be placed in the non-FFR mode if operating in an FFR mode resulted in unexpected (and undesired) performance.

The ICIC controller may perform a check to determine if conditions for a switch to ICIC mode have been met (block 710). As discussed previously, conditions for the switch to ICIC mode, e.g., FFR mode, may include UE distribution geometry (e.g., cell center UEs, cell edge UEs, or so on), number of scheduled UEs, cell load, interference level, handover performance, or combinations thereof.

If the conditions for the switch to ICIC mode have been met, the ICIC controller may change the operating mode of the communications system to FFR mode (block 715). If the conditions for the switch to ICIC mode have not been met, then the ICIC controller may let the communications system continue operating in non-FFR mode.

With the communications controller switched over to ICIC mode, the ICIC controller may perform a check to determine if there has been a performance change in the communications network as expected (block 720). Examples of expected performance changes may include increased overall communications system performance, decreased interference between cells, improved handover completion performance, and so forth.

If the expected performance changes occurred, then the ICIC controller may allow the communications system to continue operating in ICIC mode. However, if unexpected performance changes occurred, then the ICIC controller may change the operation mode of the communications system back to non-ICIC mode (block 705).

Figure 8:
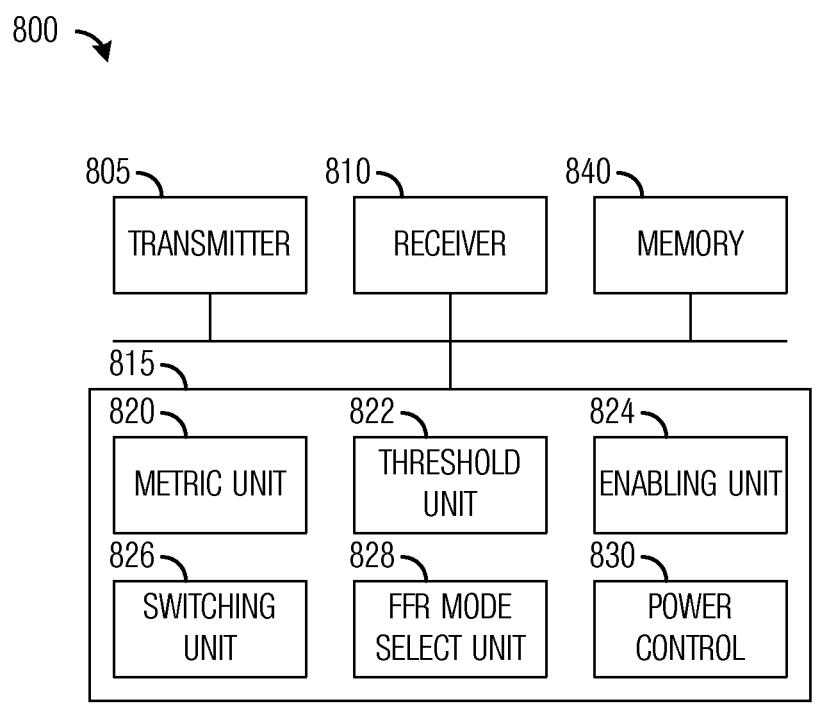
FIG. 8 provides an example communications device according to example embodiments described herein.

FIG. 8 illustrates a communications device 800. Communications device 800 may be an implementation of an ICIC controller, such as an ICIC controller 450, ICIC controller 445, or an ICIC controller located in an eNB, such as ICIC controller 440, or so on, that may be used to determine an operating mode of a communications system, a portion thereof, an eNB, or combinations thereof. Communications device 800 may be used to implement various ones of the embodiments discussed herein. As shown in FIG. 8, a transmitter 805 is configured to transmit information and a receiver 810 is configured to receive information.

A metric unit 820 is configured to determine metric(s) for the communications system based on information received by communications device 800 and/or collected by communications device 800. For example, communications device 800 may receive measurements from UEs, mutual relationship information, collect performance data of its own, or combinations thereof. A threshold unit 822 is configured to compare metric(s) with threshold(s) to determine if an operating mode switch should be performed. Threshold unit 822 may receive the threshold(s) from an operator of the communications system, retrieve the threshold(s) from a database (remote and/or local) or a memory, or so on. An enabling unit 824 is configured to enable and/or disable operating modes of the communications system, the portion of the communications system, the eNB, or so on.

Enabling unit 824 enables and/or disables operating modes in accordance with results of threshold unit 822. A switching unit 826 is configured to switch the operating mode of the communications system. An FFR mode select unit 828 is configured to select and/or optimize FFR modes for the communications system, the portion of the communications system, the eNB, and so forth. FFR mode select unit 828 uses selection algorithms to maximize performance, minimize interference, or a combination thereof. A power control unit 830 is configured to set transmit power levels in the communications system in accordance with the operating mode of the communications system as well as the FFR mode. Power control unit 830 is also configured to signal UEs of changes in transmit power levels. A memory 840 is configured to store thresholds, operating mode information, FFR modes, power control information, and so forth.

The elements of communications device 800 may be implemented as specific hardware logic blocks. In an alternative, the elements of communications device 800 may be implemented as software executing in a processor, controller, application specific integrated circuit, or so on. In yet another alternative, the elements of communications device 800 may be implemented as a combination of software and/or hardware.

As an example, receiver 810 and transmitter 805 may be implemented as a specific hardware block, while metric unit 820, threshold unit 822, enabling unit 824, switching unit 826, FFR mode select unit 828, and power control unit 830 may be software modules executing in a microprocessor (such as processor 815), a custom circuit, a custom compiled logic array of a field programmable logic array, or combinations thereof.

Although the present invention and its advantages have been described in detail, it should be understood that various changes, substitutions and alterations can be made herein without departing from the spirit and scope of the invention as defined by the appended claims.

What is claimed is:

1. A method for controller operations, the method comprising:
    collecting performance information about a communications system comprising a plurality of communications controllers;
    determining a performance indicator from the performance information;
    automatically switching an operating mode of the communications system from a first operating mode to a second operating mode in response to determining that the performance indicator meets a performance threshold, wherein the first operating mode comprises a non-inter-cell interference coordination (non-ICIC) mode, and wherein the second operating mode comprises an ICIC mode;
    determining a frequency reuse mode for a first subset of communications controllers of the plurality of communications controllers in response to determining that the performance indicator meets the performance threshold;
    applying the frequency reuse mode to the first subset of communications controllers; and
    removing the frequency reuse mode from the first subset of communications controllers in response to a performance change being less than an expected threshold, the performance change being measured after applying the frequency reuse mode to the first subset of communications controllers.

2. The method of claim 1, wherein collecting the performance information comprises receiving Reference Signal Received Power measurements.

3. The method of claim 1, wherein collecting the performance information comprises receiving mutual relationship information from a reporting communications controller in the communications system.

4. The method of claim 3, wherein collecting the performance information further comprises determining global mutual relationship information from the received mutual relationship information.

5. The method of claim 1, wherein the performance information comprises one or more of the following: a load of the communications system, a traffic pattern of the communications system, error rates of the communications system, data rates of the communications system, handover performance of the communications system, loads of communications controllers in the communications system, a traffic pattern of the communications controllers in the communications system, error rates of the communications controllers in the communications system, data rates of the communications controllers in the communications system.

6. The method of claim 1, wherein the method further comprises switching back to the first operating mode in response to determining that a performance metric of the communications system indicates a performance decrease after the automatically switching.

7. The method of claim 1, wherein the performance indicator comprises a count of communications devices scheduled for transmission, and wherein the performance threshold comprises a specified number of communications controllers in the communications system with more than a specified number of communications devices scheduled for transmission.

8. The method of claim 1, wherein the performance indicator comprises a load on a communications controller in the communications system, and wherein the performance threshold comprises a specified number of communications controllers in the communications system with the load of more than a specified load value.

9. The method of claim 8, wherein the load comprises a resource block utilization percentage.

10. The method of claim 1, wherein the performance indicator comprises an interference level between pairs of communications controllers in the communications system, and wherein the performance threshold comprises a specified number of pairs of communications controllers with interference levels exceeding a specified interference number.

11. The method of claim 1, wherein determining the frequency reuse mode for the first subset of communications controllers is in accordance with an interference level at each communications controller in the first subset, a load at each communications controller in the first subset, a number of scheduled communications devices at each communications controller in the first subset, a handover performance at each communications controller in the first subset, or a combination thereof.

12. The method of claim 1, wherein a reuse-1 mode is selected for communications controllers in the plurality of communications controllers but not in the first subset.

13. The method of claim 12, wherein a transmit power level other than a maximum transmit power level is selected for the communications controllers in the plurality of communications controllers but not in the first subset.

14. The method of claim 1, wherein the automatically switching an operating mode of the communications system further comprises automatically switching a second subset of communications controllers in the first subset of communications controllers to a third operating mode.

15. The method of claim 14, wherein the third operating mode comprises an ICIC operating mode that approximates non-ICIC operation.

16. The method of claim 15, wherein the third operating mode comprises a reuse-1 mode with a low transmit power setting.

17. The method of claim 14, wherein the automatically switching the second subset is based on fast changing information regarding the communications system.

18. The method of claim 17, wherein the fast changing information comprises at least one of the following: communications device distribution geometry for communications controllers in the first subset, a load at of communications controller in the first subset, a number of scheduled communications devices for communications controllers in the first subset.

19. The method of claim 14, wherein the automatically switching the second subset is performed at each communications controller in the second subset.

20. The method of claim 1, further comprising not changing the operating mode of the communications system in response to determining that the performance indicator does not meet the performance threshold.

21. A method for controller operations, the method comprising:

setting an operating mode for a communications system comprising a plurality of communications controllers to a non inter-cell interference coordination (ICIC) mode;

determining if a first switching condition is met;

switching the operating mode to an ICIC mode in response to determining that the first switching condition is met, wherein the operating mode is left unchanged when the first switching condition is not met;

determining if a second switching condition is met, wherein the second switching condition is met only if the operating mode is the ICIC mode;

setting a frequency reuse mode for each communications controller in a first subset of communications controllers of the plurality of communications controllers in response to determining that the second switching condition is met, wherein the frequency reuse mode of each communications controller in the first subset of communications controllers is not set when the second switching condition is not met;

determining if a third switching condition is met, wherein the third switching condition is met only if the operating mode is the ICIC mode; and switching the operating mode of each communications controller in a second subset of communications controllers in the first subset of communications controllers to an ICIC operating mode that approximates non-ICIC operation in response to determining that the third switching condition is met, wherein the operating mode is left unchanged when the third switching condition is not met.

22. The method of claim 21, wherein switching the operating mode to an ICIC mode switches the operating mode for each communications controller in the plurality of communications controllers.

23. The method of claim 21, wherein switching the operating mode to an ICIC mode is performed by a centralized controller.

24. The method of claim 21, wherein the first switching condition comprises at least one of the following: a load of the communications system, a traffic pattern of the communications system, error rates of the communications system, data rates of the communications system, handover rates of the communications system, loads of communications controllers in the communications system, a traffic pattern of the communications controllers in the communications system, error rates of the communications controllers in the communications system, data rates of the communications controllers in the communications system, and wherein determining if the first switching condition is met comprises determining if the first switching condition meets a first threshold or a plurality of first thresholds.

25. The method of claim 21, wherein the setting the frequency reuse mode for each communications controller in the first subset is performed by a centralized controller.

26. The method of claim 21, wherein the second switching condition comprises at least one of the following: a load of each communications controller in the plurality of communications controllers, a traffic pattern of each communications controller in the plurality of communications controllers, error rates of each communications controller in the plurality of communications controllers, data rates of each communications controller in the plurality of communications controllers, and wherein determining if the second switching condition is met comprises determining if the second switching condition meets a second threshold or a plurality of second thresholds and if the operating mode is the ICIC mode.

27. The method of claim 21, wherein switching the operating mode of each communications controller in the second subset is performed by each communications controller in the first subset.

28. The method of claim 21, wherein the third switching condition comprises at least one of the following: communications device distribution geometry for each communications controllers in the first subset, a load of communications controller in the first subset, and wherein determining if the third switching condition is met comprises determining if the third switching condition meets a third threshold or a plurality of third thresholds and if the operating mode is the ICIC mode.

29. The method of claim 21, further comprising switching the operating mode to the non-ICIC operating mode in response to determining that a fourth switching condition is met.

30. The method of claim 29, wherein the fourth switching condition comprises a decrease in performance of the communications system.

31. A controller comprising:
a processor configured to:
collect performance information about a communications system comprising a plurality of communications controllers;
determine a performance indicator from the performance information;
determine if the performance indicator meets a performance threshold;
switch an operating mode of the communications system from a non-inter-cell interference coordination (non-ICIC) mode to an ICIC mode in response to determining that the performance indicator meets the performance threshold;
determine a frequency reuse mode for a first subset of communications controllers of the plurality of communications controllers in response to determining that the performance indicator meets the performance threshold;
apply the frequency reuse mode to the first subset of communications controllers; and
remove the frequency reuse mode from the first subset of communications controllers in response to a performance change being less than an expected threshold, the performance change being measured after applying the frequency reuse mode to the first subset of communications controllers.

32. The controller of claim 31, further comprising a receiver coupled to the processor, the receiver configured to receive Reference Signal Received Power measurements, and to receive mutual relationship information from a reporting communications controller in the communications system.

33. The controller of claim 31, wherein the processor is further configured to switch a second subset of communications controllers of the first subset of communications controllers to a third operating mode.

34. The controller of claim 31, wherein the processor is further configured to set a transmit power level based on the operating mode.

35. The controller of claim 31, wherein the performance indicator comprises a count of communications devices scheduled for transmission, and wherein the performance threshold comprises a specified number of communications controllers in the communications system with more than a specified number of communications devices scheduled for transmission.

36. The controller of claim 31, wherein the performance indicator comprises a load on a communications controller in the communications system, and wherein the performance threshold comprises a specified number of communications controllers in the communications system with the load of more than a specified load value.

37. The controller of claim 31, wherein the performance indicator comprises an interference level between pairs of communications controllers in the communications system, and wherein the performance threshold comprises a specified number of pairs of communications controllers with interference levels exceeding a specified interference number.

38. The controller of claim 31, wherein the processor is configured to determine the frequency reuse mode for the first subset of communications controllers in accordance with an interference level at each communications controller in the first subset, a load at each communications controller in the first subset, a number of scheduled communications devices at each communications controller in the first subset, a handover performance at each communications controller in the first subset, or a combination thereof.

39. The controller of claim 31, wherein the processor is further configured to not change the operating mode of the communications system in response to determining that the performance indicator does not meet the performance threshold.

* * * * *

UNITED STATES PATENT AND TRADEMARK OFFICE
CERTIFICATE OF CORRECTION

PATENT NO. : 10,116,402 B2
APPLICATION NO. : 13/283022
DATED : October 30, 2018
INVENTOR(S) : Jianglei Ma et al.

It is certified that error appears in the above-identified patent and that said Letters Patent is hereby corrected as shown below:

In Column 16, Lines 66-67, Claim 21, delete "the method comprising;" and insert --the method comprising:--.

Signed and Sealed this
Fifteenth Day of January, 2019

Andrei Iancu
*Director of the United States Patent and Trademark Office*